United States Patent
Caplan et al.

(10) Patent No.: US 10,223,346 B2
(45) Date of Patent: Mar. 5, 2019

(54) HYBRID CLIENT/NETWORK SERVICE APPLICATION INTEGRATION

(75) Inventors: Josh Caplan, Bellevue, WA (US); Sergei Gundorov, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 544 days.

(21) Appl. No.: 13/013,526

(22) Filed: Jan. 25, 2011

(65) Prior Publication Data

US 2012/0192052 A1 Jul. 26, 2012

(51) Int. Cl.
G06F 3/12 (2006.01)
G06F 17/24 (2006.01)
G06F 17/30 (2006.01)
G06F 17/00 (2006.01)

(52) U.S. Cl.
CPC ...... *G06F 17/246* (2013.01); *G06F 17/30595* (2013.01); *G06F 3/1224* (2013.01)

(58) Field of Classification Search
CPC . G06F 17/246; G06F 17/30595; G06F 3/1224
USPC ................. 715/209, 212–239, 748
See application file for complete search history.

(56) References Cited

U.S. PATENT DOCUMENTS

| | | | | |
|---|---|---|---|---|
| 7,047,484 B1* | 5/2006 | Becker | ............... | G06Q 10/10 709/203 |
| 7,195,150 B2 | 3/2007 | Battagin et al. | ............... | 235/377 |
| 7,553,139 B2 | 5/2009 | Jones | ............... | 708/200 |
| 7,555,484 B2 | 6/2009 | Kulkarni et al. | | |
| 7,640,490 B2 | 12/2009 | Boon | ............... | 715/219 |
| 2005/0267868 A1 | 12/2005 | Liebl et al. | | |
| 2006/0024653 A1* | 2/2006 | Battagin et al. | ............... | 434/350 |
| 2007/0078852 A1* | 4/2007 | Chen et al. | ............... | 707/8 |
| 2007/0168323 A1* | 7/2007 | Dickerman et al. | ............... | 707/2 |
| 2007/0233811 A1* | 10/2007 | Rochelle | ............... | G06F 17/246 709/219 |
| 2007/0250764 A1 | 10/2007 | Jiang | ............... | 715/212 |
| 2009/0006466 A1* | 1/2009 | Ellis et al. | ............... | 707/103 R |
| 2009/0083615 A1* | 3/2009 | Kotler et al. | ............... | 715/219 |
| 2009/0113284 A1* | 4/2009 | Kulkarni | ............... | G06F 17/246 715/219 |

(Continued)

OTHER PUBLICATIONS

Ibeesolutions.com; Excel Services Architecture:—Published Date: Feb. 4, 2008; http://blog.ibeesolutions.com/tag/excel-calculation-services; 4 pgs.

(Continued)

*Primary Examiner* — Quoc A Tran (57) ABSTRACT

A client application uses a network service to perform calculations involving non-local data. A client application performs calculations relating to local data and the network service performs calculations relating to the non-local data. For example, a client spreadsheet application sends a command to the network service for performing calculations in a spreadsheet workbook that use data that is non-local to the client spreadsheet application. The calculation engine of the network service performs the calculations for the workbook relating to the non-local data and sends the results of the calculations back to the client application. The client application integrates the results received from the network service with any locally calculated results performed by the client application.

20 Claims, 5 Drawing Sheets

(56) References Cited

U.S. PATENT DOCUMENTS

2009/0292730 A1   11/2009  Li et al.
2010/0241466 A1*  9/2010   Chambers et al.  ............... 705/4

OTHER PUBLICATIONS

Microsoft; Excel Services Technical Overview—Published Date: Nov. 2006; http://msdn.microsoft.com/en-us/library/aa972194(office.12).aspx#; 31 pgs.

* cited by examiner

HYBRID CLIENT/NETWORK SERVICE APPLICATION INTEGRATION

BACKGROUND

Many people utilize client based applications or web based applications to perform tasks. For example, a user may use a client spreadsheet program that resides on a user's computer to interact with spreadsheets. Other users may use a web based spreadsheet program in which the spreadsheet application resides on an external server. Generally, a user is provided with a richer user experience when using a client application as compared to using a web based application. For example, the graphics displayed by a client application may be more rich.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A client application uses a network service to perform calculations involving non-local data. A client application performs calculations relating to local data and the network service performs calculations relating to the non-local data. For example, a client spreadsheet application sends a command to the network service for performing calculations in a spreadsheet workbook that use data that is non-local to the client spreadsheet application. The calculation engine of the network service performs the calculations for the workbook relating to the non-local data and sends the results of the calculations back to the client application. The client application integrates the results received from the network service with any locally calculated results performed by the client application.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
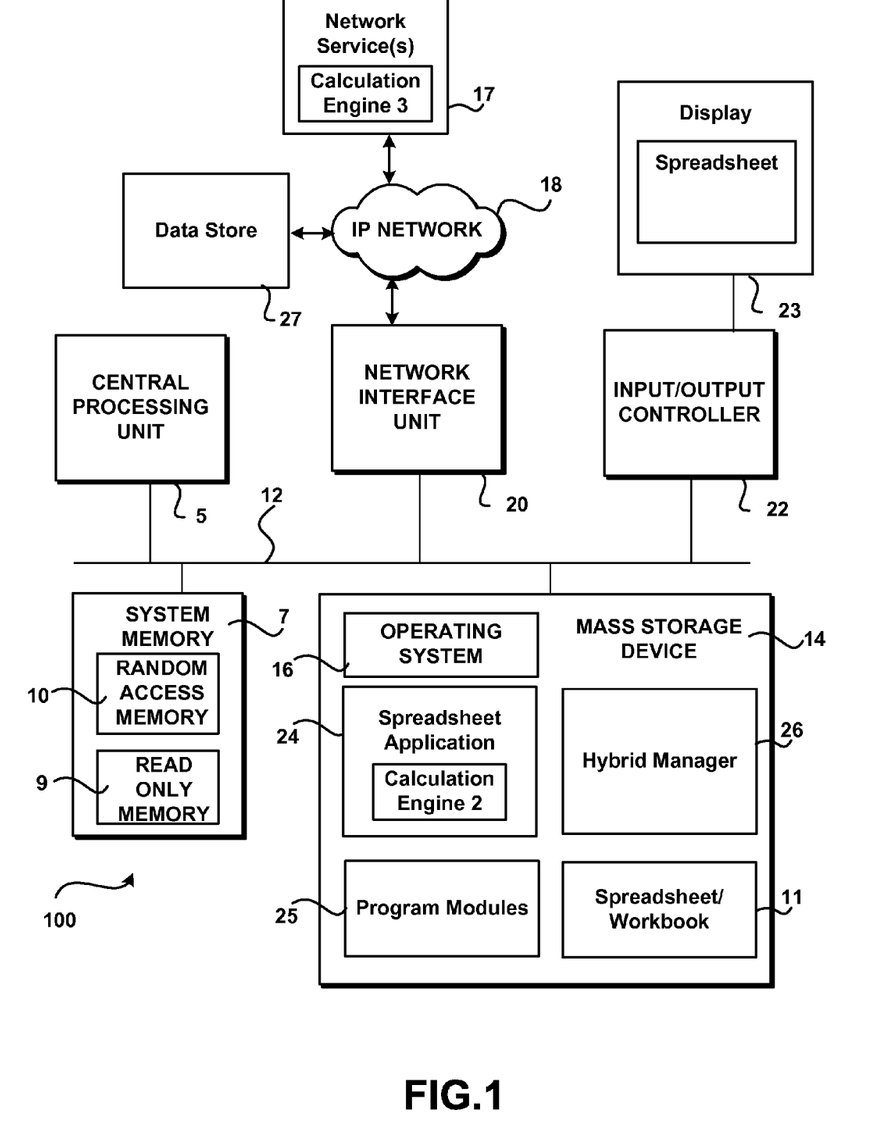
FIG. 1 illustrates an exemplary computing environment.

Referring now to FIG. 1, an illustrative computer environment for a computer 100 utilized in the various embodiments will be described. The computer environment shown in FIG. 1 includes computing devices that each may be configured as a server, a desktop or mobile computer, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, spreadsheet 11, spreadsheet application 24, other program modules 25, and hybrid manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to an IP phone, a display screen 23, a printer, or other type of input/output device.

As mentioned briefly above, a number of program modules and data files may be stored in the mass storage device 14 and RAM 9 of the computer 100, including an operating system 16 suitable for controlling the operation of a computer, such as WINDOWS SERVER® or the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs, including a spreadsheet application 24 and program modules 25. According to an embodiment, the spreadsheet application 24 is the MICROSOFT EXCEL spreadsheet application. Other spreadsheet applications may also be used. The calculation engines (calculation engine 2 and calculation engine 3) perform operations relating to the spreadsheet/workbook 11. According to an embodiment, the calculation engine is a component within the spreadsheet application 24 of the client computing device and/or the network service 17. The calculation engine, however, may be located externally from the spreadsheet application. The operations performed by calculation engine may be mathematical, such as summation, division, multiplication, calculations on extensible values, etc., or may include other functions or features, such as interacting with a data store, such as data store 27. The calculation engine may be configured to perform many different operations. According to an embodiment, calculation engine 2 and calculation engine 3 comprise the same functionality and generate the same results given the same input.

Hybrid manager 26 is configured to use a network service to perform some of the calculations for spreadsheet application 24. Generally, calculations performed by a network service are performed faster than a client device. Hybrid manager 26 may be located externally from spreadsheet application 24 as shown or may be a part of spreadsheet application 24. Further, all/some of the functionality provided by hybrid manager 26 may be located internally/externally from spreadsheet application 24.

A client application, such as spreadsheet application 24, uses the calculation engine 3 that is associated with network service 17 to perform calculations involving a spreadsheet. As illustrated, spreadsheet application 24 performs calculations relating to local data using calculation engine 2 and the network service 17 performs calculations relating to non-local data, such as data in data store 27, using calculation engine 3. For example, client spreadsheet application 24 sends a command to network service 17 to perform calculations in workbook 11 that depend on non-local data in data store 27. The calculation engine 3 of the network service 17 performs the calculations in the workbook 11 relating to the non-local data and sends the results of the calculations back to the client device that includes the spreadsheet application. The workbook may be stored in one or more locations. For example, a copy of the workbook may be stored locally on a computing device and/or a copy may be stored in a data store that is associated with network service 17. Client spreadsheet application 24 integrates the results received from network service 17 with any locally calculated results performed by client spreadsheet application 24.

Figure 2:
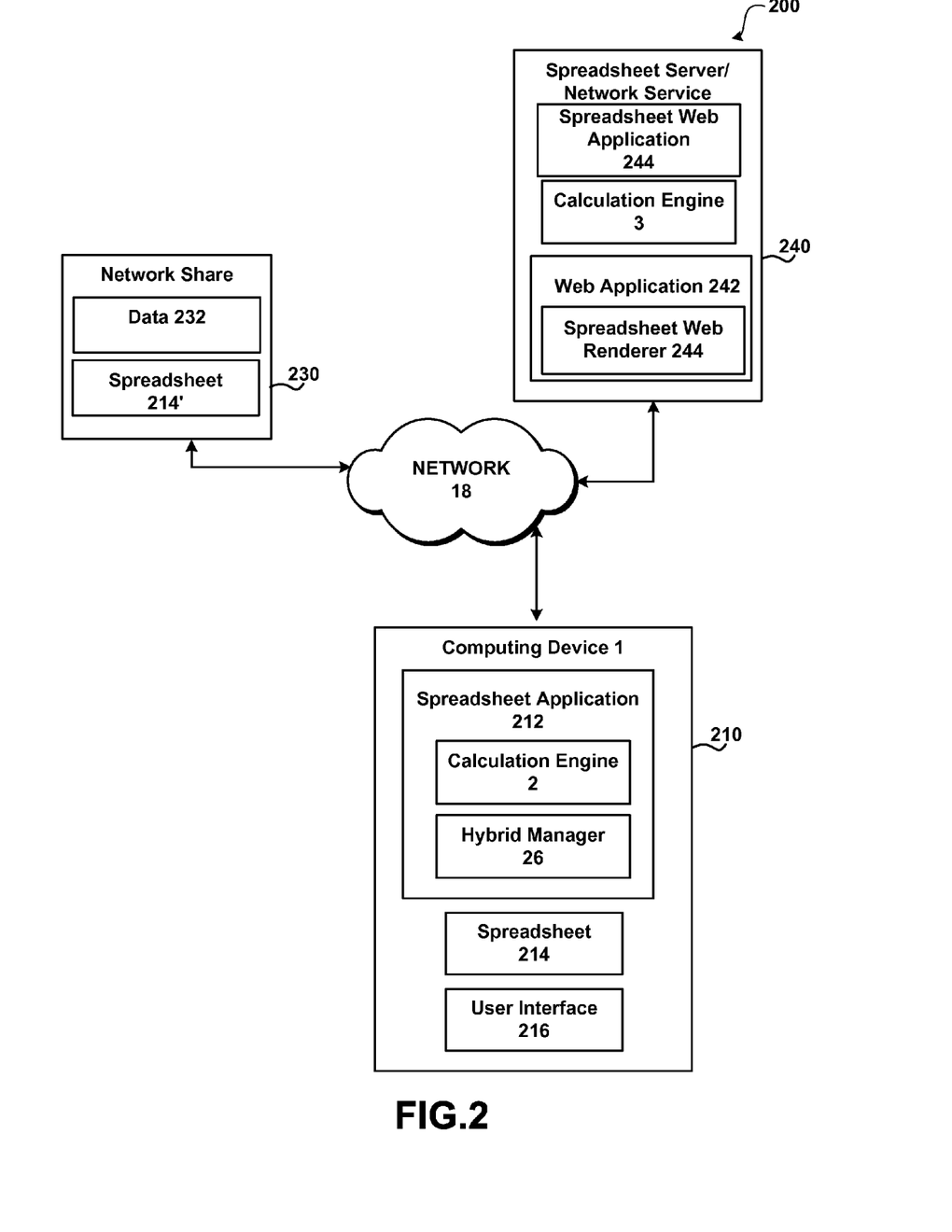
FIG. 2 shows a hybrid system for performing spreadsheet calculations using both a network service and a client application.

FIG. 2 shows a hybrid system for performing spreadsheet calculations using both a network service and a client application. As illustrated, system 200 includes computing device 1 (210), network share 230 and spreadsheet server/network service 240.

The computing devices may be configured in different ways. For example, some of the computing devices may be: mobile computing devices (e.g. cellular phones, tablets, smart phones, laptops, and the like); desktop computing devices and servers. Some computing devices may be arranged to provide an online cloud based service (e.g. interacting with spreadsheets online), some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 1, network share 230 and spreadsheet server 240.

Computing device 1 includes spreadsheet application 212, spreadsheet 214 and user interface 216. As illustrated, computing device 1 is used by a user to interact with a spreadsheet, such as spreadsheet 214 using client spreadsheet application 212.

Spreadsheet 214 comprises different cells/spreadsheet objects that may access locally stored data and external non-local stored data, such as data 232 in network share 230. The data may be many types of data. For example, the data may be structured/unstructured, multi-dimensionally stored data, live data, and/or other data that is utilized by a spreadsheet, such as spreadsheet 214 Spreadsheet user interface (UI) 216 is used to interact with a spreadsheet application, such as spreadsheet application 212.

Spreadsheet 214 may be stored at different locations. For example, spreadsheet 214 may be stored on computing device 1 and/or at some other location, such as network share 230 and/or server 240. All/portion of the spreadsheet 214 may be stored in network share 230 (spreadsheet 214') and/or server 240. For example, the entire spreadsheet workbook may be saved to network share 230 or only a portion of the spreadsheet workbook may be saved to the network share. The saving of spreadsheet 214 to a location accessible by server 240, such as network share 230, may occur automatically.

The spreadsheet 214 may be copied to network share 230 in response to a first request by computing device 1 to perform a non-local calculation and/or in response to an update to spreadsheet 214. Network share 230 is accessible by the computing devices that interact with spreadsheet 214, such as computing device 1 and spreadsheet server 240. The network share may be associated with a network service that supports online access/interaction with the spreadsheet and spreadsheet objects. For example, spreadsheet server 240 may be configured as an network service to provide online users with the ability to interact/modify spreadsheets.

Spreadsheet server 240 includes web application 242 that comprises spreadsheet web renderer 244. According to an embodiment, spreadsheet server 240 is configured as a server that is located within an online service that is configured to provide services relating to displaying and interacting with spreadsheets. Web application 242 is configured for receiving and responding to requests relating to spreadsheet documents. For example, spreadsheet server 240 may access spreadsheet 214 or spreadsheet object 232 stored on network share 230. Web application 242 is operative to provide an interface to a user of a computing device, such as a mobile computing device that does not include a spreadsheet application, to interact with a spreadsheet accessible via network 18. Web application 242 communicates with spreadsheet calculation engine 3 for performing calculations relating to all/portion of a spreadsheet, such as the spreadsheet 214 stored at network share 230.

Spreadsheet server 240 receives requests from computing devices, such computing device 1 to perform operations/calculations relating to a spreadsheet. The computing device 1 may transmit a command to spreadsheet server 240 to perform calculations relating to spreadsheet 214. According to an embodiment, the calculations performed use data that is non-local to computing device 1. For example, spreadsheet 214 may include one or more cells that are associated with one or more external data sources that are non-local to computing device 1. When spreadsheet application 214 determines that a calculation within a spreadsheet involves non-local data, hybrid manager 26 requests the calculation engine 3 in spreadsheet server 240 to perform the calculations. The request may include different information. For example, the request may include the cells to calculate, all/portion/none of spreadsheet 214 and other information relating to the request to perform the calculations. In response to such a request, spreadsheet server 240 accesses the portion of the spreadsheet that is used in performing the calculations. Once the calculation engine 3 that is associated with spreadsheet server 240 has completed the calculations, the results of the calculations are returned by the spreadsheet server 240 to the requesting computing device, such as computing device 1, where the results are include with locally computed results by the local calculation engine.

For example, a user may open a reporting workbook, such as spreadsheet 214, using spreadsheet application 212. The user selects the runtime filters for the report and clicks refresh. The spreadsheet application 212 connects to spreadsheet server 240 that opens a server side instance of the same report workbook. In one or more commands, hybrid manager 26 passes the users' parameter selection to the spreadsheet server 240 that involve non-local data. Calculation engine 3 of spreadsheet server 240 performs the calculations involving the non-local data and refreshes the calculations and external data. Generally, server 240 and the server(s) with the external data used by spreadsheet 214 have a fast network connection between them. When the refresh is finished by spreadsheet server 240, a snapshot of the results is taken and returned back to client computing device 1. Client spreadsheet application 212 receives the results and uses the worksheet with the updated results to replace the portion of the active worksheet with the results from the network server. This helps in providing users a seamless experience while improving calculation times involving non-local data.

Figure 3:
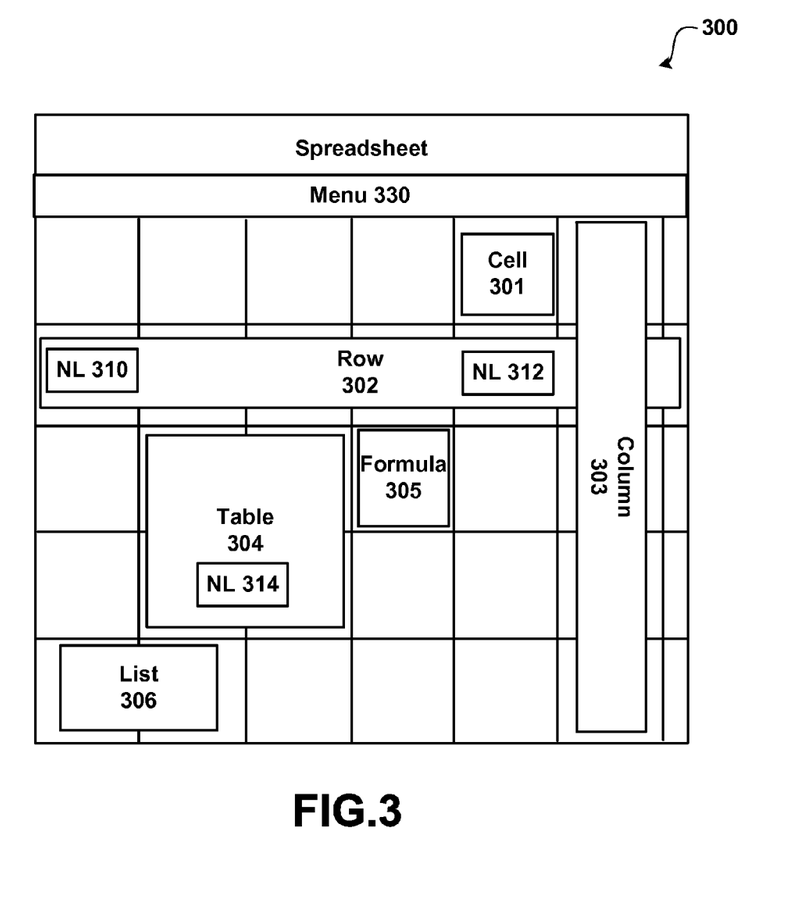
FIG. 3 shows an exemplary spreadsheet accessing non-local data.

FIG. 3 shows a spreadsheet comprising different cells and spreadsheet objects that may access non-local data. As illustrated spreadsheet 300 shows different user interfaces, menus, and spreadsheet objects including cell 301, row 302, column 303, table 304, formula 305 and list 306. While only one object of each type is shown, more or fewer objects may be included within spreadsheet 300. Other types of objects may also be included within spreadsheet 300 that may use local/non-local data. As illustrated, row 302 accesses non-local data 310 and non-local data 312. Table 304 accesses non-local data 314.

Spreadsheet 300 includes a grid having rows and columns. The columns and rows define the workspace for the currently selected workbook. Each of the cells defined by a particular row and column combination can be edited with numerical or text data and commands may be performed on the various cells to perform virtually unlimited types of analysis operations.

Spreadsheet 300 also includes various user interface elements for navigating within the currently selected spreadsheet or within other spreadsheets within the currently selected workbook. Spreadsheet 300 also shows exemplary user interfaces that may be used in interacting with the spreadsheet objects, such as menu 330. The menu 330 may include many different user interface elements. The operations that involve non-local data are performed by an external calculation engine and the calculations that do not involve non-local data are performed by a local calculation engine.

Figure 4:
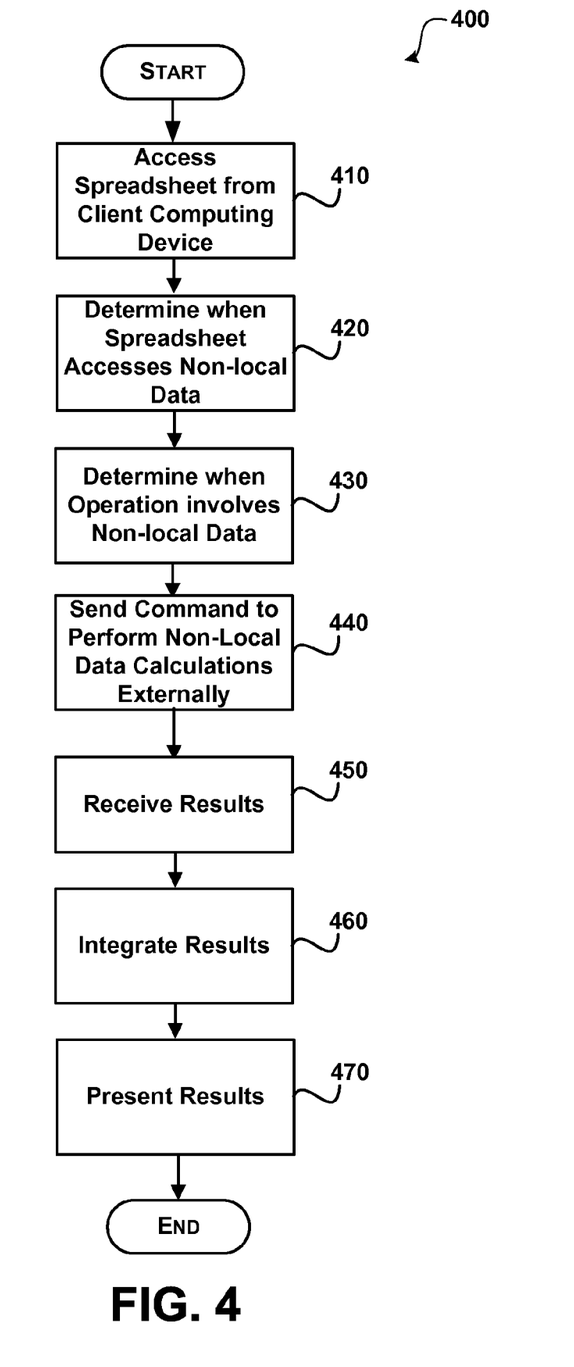
FIG. 4 shows a client application using an external calculation engine to perform calculations.
Figure 5:
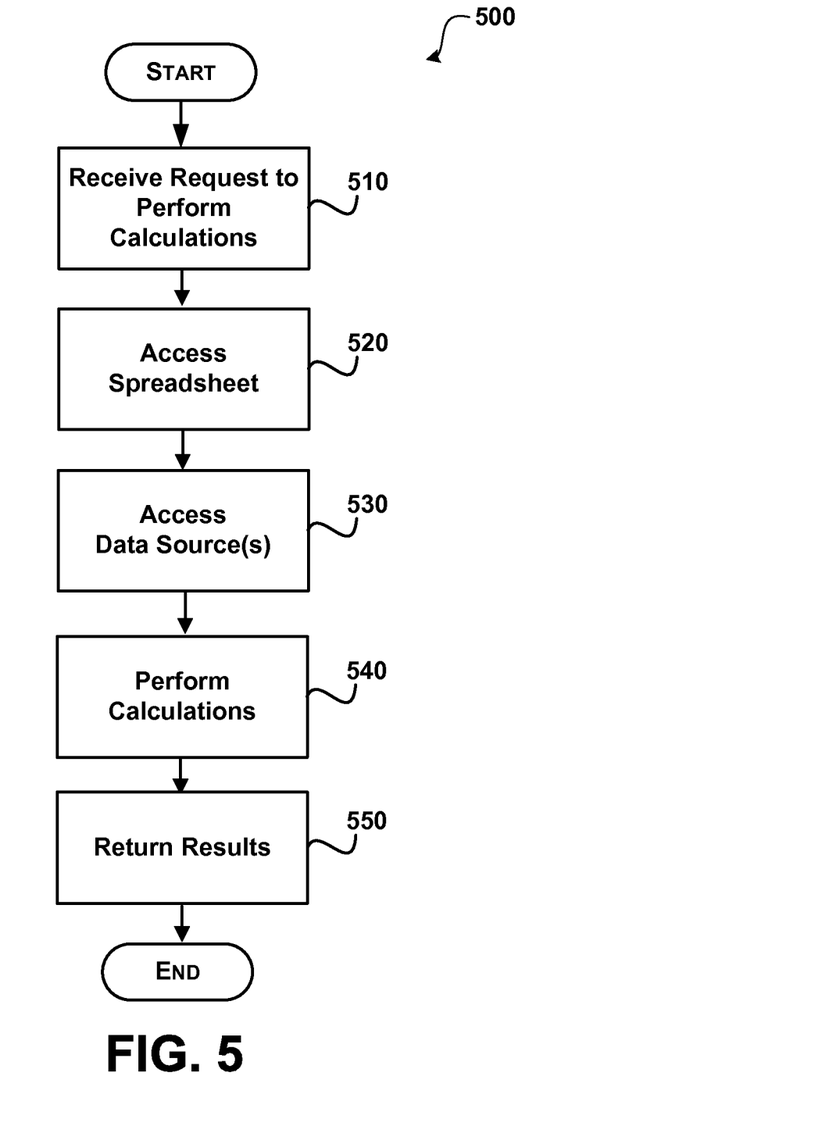
FIG. 5 shows a network service performing calculations for a client application.

Referring now to FIGS. 4 and 5 an illustrative process for performing hybrid calculations will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 4 shows a client application using an external calculation engine to perform calculations.

After a start block, process 400 moves to operation 410, where a spreadsheet is accessed from a client computing device. The client computing device comprises a spreadsheet application that includes a calculation engine that performs calculations relating to the accessed spreadsheet.

Moving to operation 420, a determination is made as to whether the spreadsheet uses non-local data. For example, the spreadsheet may include one or more cells that reference one or more external non-local data sources. Non-local data may be any data that is stored externally from the client computing device.

Flowing to operation 430, a determination is made as to when an operation on the spreadsheet involves non-local data. Generally, when a cell references non-local data, then the operation involves non-local data.

Transitioning to operation 440, the non-local data calculations are performed externally from the client computing device. According to an embodiment, the calculations for a spreadsheet involving non-local data to the client computing device are performed by a network service that performs spreadsheet calculations. The calculations may be performed by one or more external computing devices using one or more calculation engines.

Flowing to operation 450, the results from the calculations performed externally are received by the client computing device. According to an embodiment, the client computing device receives the results of the calculations without receiving other information relating to the spreadsheet. According to another embodiment, the results include a copy of the spreadsheet.

Moving to operation 460, the non-locally calculated results are integrated with locally calculated results. For example, a spreadsheet may include operations that are processed by a local calculation engine that are integrated with the results received from the external calculation engine. According to an embodiment, the non-local calculation engine provides results in a same format as the local calculation engine to the client application on the client computing device.

Moving to operation 470, the results are presented on the client computing device using the client application. Generally, the results presented on the client computing device using the client application provide a better user experience as compared to only using a network service based application. For example, a web browser may be used to present the results. Other applications may also be used to present the results.

The process then flows to an end block and returns to processing other actions.

FIG. 5 shows a network service performing calculations for a client application.

After a start block, process 500 moves to operation 510, where a request to perform calculations for a spreadsheet is received from a client application on a client computing device. According to an embodiment, the request is received by a network service, such as an online spreadsheet service, that provides spreadsheet services.

Moving to operation 520, the spreadsheet on which to perform actions is accessed. According to an embodiment, the network service maintains a copy of the spreadsheet that is used by the client application from which the request is received. According to another embodiment, the spreadsheet may be accessed in other ways. For example, all/portion of the spreadsheet may be provided to the network service.

Flowing to operation 530, the data source(s) are accessed to obtain the data used in the calculations that are performed by the calculation engine of the network service. The data source(s) that are accessed are non-local data sources to the client computing device.

Transitioning to operation 540, the non-local data calculations for the client application are performed by the network service. According to an embodiment, the calculations are performed by one or more calculation engines of a network service that performs spreadsheet calculations. The calculations may be performed by one or more computing devices that are associated with the network service.

Flowing to operation 550, the results are returned to the client computing application on the client computing device. According to an embodiment, the results returned consist of the calculated results. The results may also include other information.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for performing calculations using a client application and a network service, comprising:
    accessing a client spreadsheet using a client application on a first computing device, the client spreadsheet being associated with local data that is stored locally to the client application and non-local data that is stored non-locally to the client application, wherein the client application is configured to perform hybrid calculations and comprises a hybrid manager that integrates non-local results of calculations in the client spreadsheet that are associated with the non-local data and are performed by a network service and local results of calculations in the client spreadsheet that are associated with local data and are performed by a local calculation engine;
    determining when the client spreadsheet accesses the non-local data;
    based upon determining that a calculation involves the non-local data, sending a command to the network service requesting the calculation be performed by the network service;
    receiving from the network service results of the calculations involving the non-local data performed by the network service; and
    integrating the results received from the network service with the local results; and presenting the integrated results using the client application.

2. The method of claim 1, wherein the client application is a spreadsheet application and wherein the spreadsheet is stored on the client computing device.

3. The method of claim 1, wherein the non-local data are located within a different network from the client computing device.

4. The method of claim 1, further comprising storing at least a portion of the spreadsheet on the network service.

5. The method of claim 1, further comprising the client application sending a copy of the spreadsheet to the network service.

6. The method of claim 1, wherein the calculation engine on the client computing device and a calculation engine for the network service that performs the calculations involving the non-local data are configured to perform the same operations.

7. The method of claim 1, wherein the command comprises a list of cells in the spreadsheet to be calculated that involve the non-local data.

8. The method of claim 1, further comprising receiving selections at the client application that set runtime filters for a report and sending the received selections to the network service in the command.

9. The method of claim 1, wherein integrating the results received by the network service comprise replacing a portion of the spreadsheet on the client computing device with the results.

10. A computer-readable storage medium, excluding a signal, storing computer-executable instructions for performing calculations using a client application and a network service, comprising:
    accessing a client spreadsheet that is local to a client computing device using a client spreadsheet application on the client computing device, the client spreadsheet being associated with local data that is stored locally to the client spreadsheet application and non-local data that is stored non-locally to the client spreadsheet application, wherein the client spreadsheet application is configured to perform hybrid calculations and comprises a hybrid manager that integrates non-local results of calculations in the client spreadsheet that are associated with the non-local data and are performed by a network service and local results of calculations in the client spreadsheet that are associated with local data and are performed by a local calculation engine;
    determining when the client spreadsheet accesses non-local data that is stored at a different location from the client computing device;
    based upon determining that a calculation involves the non-local data, sending a command to the network service requesting the calculation be performed by a calculation engine of the network service;
    receiving from the network service results of the calculations performed by the network service involving the non-local data;
    integrating the results received from the network service with local results calculated by the calculation engine of the client spreadsheet application; wherein the local results and the received results are different; and
    presenting the integrated results using the client spreadsheet application.

11. The computer-readable storage medium of claim 10, wherein the non-local data are located within a different network from the client computing device.

12. The computer-readable storage medium of claim 10, further comprising storing at least a portion of the spreadsheet on the network service.

13. The computer-readable storage medium of claim 10, wherein the calculation engine on the client computing device and the calculation engine for the network service include the same functionality.

14. The computer-readable storage medium of claim 10, wherein the command comprises a list of cells in the spreadsheet to be calculated that involve the non-local data.

15. The computer-readable storage medium of claim 10, further comprising receiving selections at the client spreadsheet application that set runtime filters for a report and sending the received selections to the network service in the command.

16. The computer-readable storage medium of claim 10, wherein integrating the results received by the network service comprise replacing a portion of the spreadsheet on the client computing device with the results.

17. A system for performing calculations using a client application and a network service, comprising:
a display;
a network connection that is configured to connect to a network;
a processor, memory, and a computer-readable storage medium excluding a signal;
an operating environment stored on the computer-readable storage medium and executing on the processor;
a client spreadsheet application including a calculation engine;
a client spreadsheet associated with local data that is stored locally to the client spreadsheet application and non-local data that is stored non-locally to the client spreadsheet application, wherein the client spreadsheet comprises spreadsheet objects; and
a hybrid manager operating in conjunction with the client spreadsheet application to perform hybrid calculations, wherein the hybrid manager integrates non-local results of calculations in the client spreadsheet that are associated with the non-local data and are performed by a network service and local results of calculations in the client spreadsheet that are associated with local data and are performed by a local calculation engine, the hybrid manager being configured to:
determine when the client spreadsheet accesses the non-local data that is stored in a different location from a computing device storing the client spreadsheet application;
based upon determining that a calculation involves the non-local data, send a command to the network service requesting the calculation be performed by a calculation engine of the network service;
receive from the network service results of the calculation performed by the network service involving the non-local data;
integrate the results received from the network service with local results calculated by the calculation engine of the client spreadsheet application; wherein the local results and the received results are different; and
display the integrated results on the display.

18. The system of claim 17, wherein the calculation engine on the client computing device and the calculation engine for the network service include the same functionality.

19. The system of claim 17, wherein the command comprises a list of cells in the spreadsheet to be calculated that involve the non-local data.

20. The system of claim 17, wherein integrating the results received by the network service comprise replacing a portion of the spreadsheet with the results.

* * * * *